[12] United States Patent
Baker

(10) Patent No.: US 11,187,558 B2
(45) Date of Patent: Nov. 30, 2021

(54) INCREMENTAL ENCODER POSITION INTERPOLATION

(71) Applicant: e1ectr0n, Inc., Hillsboro, OR (US)

(72) Inventor: Scott L. Baker, Portland, OR (US)

( * ) Notice: Subject to any disclaimer, the term of this patent is extended or adjusted under 35 U.S.C. 154(b) by 241 days.

(21) Appl. No.: 16/515,990

(22) Filed: Jul. 18, 2019

(65) Prior Publication Data

US 2021/0018340 A1 Jan. 21, 2021

(51) Int. Cl.
*G01D 5/245* (2006.01)
*G01D 5/244* (2006.01)
*G01D 18/00* (2006.01)

(52) U.S. Cl.
CPC ......... *G01D 5/2451* (2013.01); *G01D 5/2448* (2013.01); *G01D 18/008* (2013.01)

(58) Field of Classification Search
None
See application file for complete search history.

(56) References Cited

U.S. PATENT DOCUMENTS

| | | | |
|---|---|---|---|
| 3,798,557 A | 3/1974 | Scott et al. | |
| 6,355,927 B1 | 3/2002 | Snyder | |
| 7,085,668 B2 | 8/2006 | Johnson | |
| 7,265,339 B1 | 9/2007 | Ng et al. | |
| 7,324,566 B2 | 1/2008 | Baker | |
| 7,865,324 B2 | 1/2011 | Lindberg et al. | |
| 2007/0205736 A1* | 9/2007 | Lindberg | G01D 5/24476 318/490 |
| 2018/0231400 A1* | 8/2018 | Okumura | G01D 5/2451 |

OTHER PUBLICATIONS

Benammar, M, et al., Amplitude to Phase Conversion Based on Analog Arcsine Synthesis for Sine-cosine Position Sensors, Oct. 2015, Sensors & Transducers, vol. 193, Issue 10, Oct. 2015, pp. 114-122, Retrieved from https://www.researchgate.net/publication/283495789_Sensors_Transducers_Amplitude_to_Phase_Conversion_Based_on_Analog_Arcsine_Synthesis_for_Sine-cosine_Position_Sensors on Jun. 14, 2019.

Burke, J., et al., Extraction of high resolution position information from sinusoidal encoders, Proceedings of the international intelligent motion conference. Intertec International, Inc, 2000. Retrieved from http://citeseerx.ist.psu.edu/viewdoc/download?doi=10.1.1.110.6422&rep=rep1&type=pdf on Jun. 14, 2019.

Craig, K, Optical Encoders, 2018, Retrieved from http://engineering.nyu.edu/mechatronics/Control_Lab/Criag/Craig_RPI/SenActinMecha/S&A_Optical_Encoders.pdf on Dec. 13, 2018.

(Continued)

*Primary Examiner* — Douglas X Rodriguez
(74) *Attorney, Agent, or Firm* — Young's Patent Services, LLC; Bruce A Young

(57) ABSTRACT

An interpolated position of an incremental encoder is provided. A first signal and a second signal having a quadrature relationship are received from the incremental encoder. A coarse position of the incremental encoder at a first time is produced using the quadrature relationship between the first signal and the second signal. An arcsine or arccosine value based on the first signal at the first time is determined using a lookup table and a fine position of the incremental encoder is calculated using the determined value. The interpolated position of the incremental encoder, based on both the coarse position and the fine position, is then provided.

19 Claims, 7 Drawing Sheets

(56) References Cited

OTHER PUBLICATIONS

EEECS461, Lecture 3, Sep. 9, 2008, Retrieved from http://web.eecs.umich.edu/~jfr/embeddedctrls/files/Lecture3.pdf on Jan. 3, 2019.
IC-Haus, High-Precision Sine/Cosine Interpolation, 2014, Retrieved from http://www.ichaus.de/upload/pdf/WP7en_High-Precision_Interpolation_140124.pdf on Jan. 3, 2019.
Koren, I, Digital Computer Arithmetic, ECE 666, Part B Division through Multiplication, 2008, Retrieved from http://euler.ecs.umass.edu/arith/slides/Part8-div-mlt.ppt on Dec. 27, 2018.
Lepple, C, Implementation of a High-speed Sinusoidal Encoder Interpolation System, Jan. 23, 2004, Retrieved from https://pdfs.semanticscholar.org/f2f0/f977fb31e171c70d0867451ba8b294a699b6.pdf on Jan. 3, 2019.
Pizzolante, V, et al., Interface to Sin/Cos Encoders With High-Resolution Position Interpolation, Texas Instruments, Jul. 2015, Retrieved from http://www.ti.com/lit/ug/tidua05a/tidua05a.pdf on 1/3/2109.
Staebler, M, Application Report SPRA496: TMS320F240 DSP-Solution for High-Resolution Position with Sin/Cos-Encoders, Texas Instruments, Dec. 1998, Retrieved from http://www.ti.com/lit/an/spra496/spra496.pdf on Jan. 3, 2019.
Van Kuijk, M.J.A., Auto Calibration of incremental analog quadrature encoders, Jul. 9, 2009, Retrieved from http://www.mate.tue.nl/mate/pdfs/10644.pdf on Jan. 3, 2019.
Van Loan, C. F. Using the Ellipse to Fit and Enclose Data Points. Department of Computer Science Cornell University, 2008, Retrieved from http://www.cs.cornell.edu/cv/otherpdf/ellipse.pdf on May 6, 2019.

\* cited by examiner

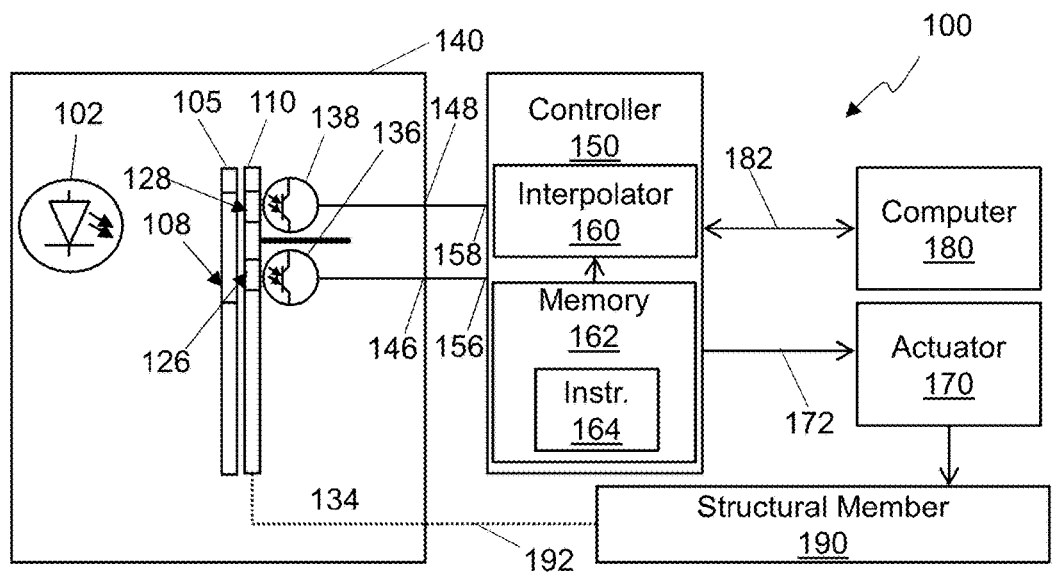
FIG. 1
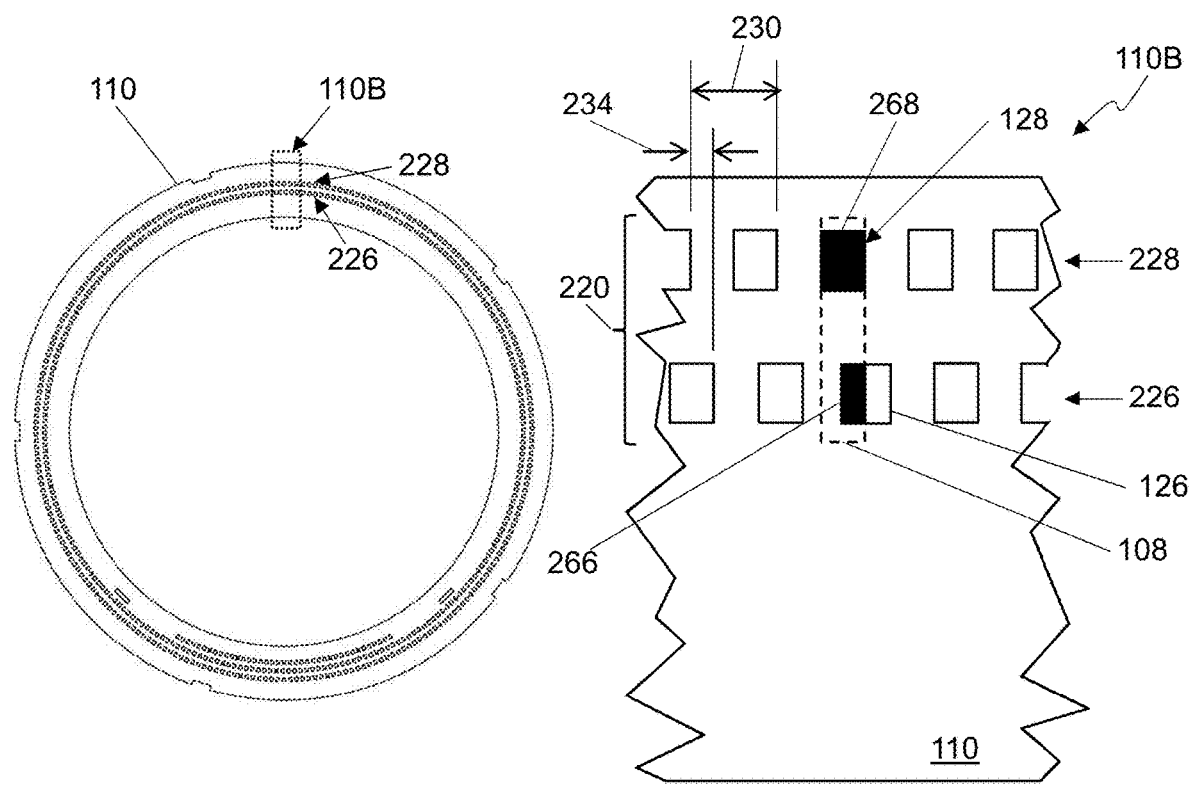
FIG. 2A
FIG. 2B

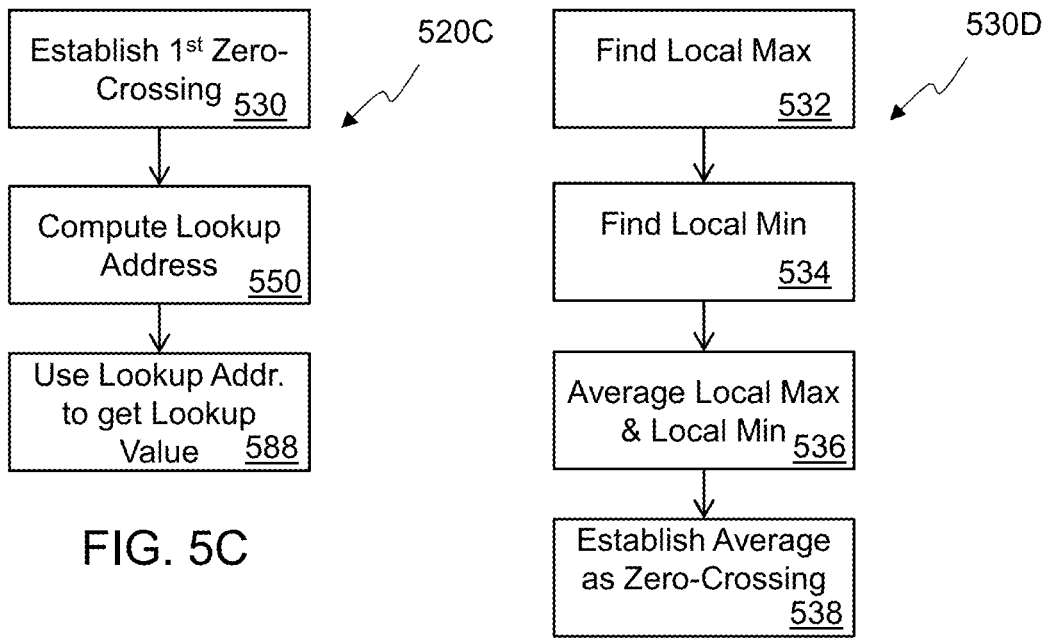
FIG. 5C
FIG. 5D
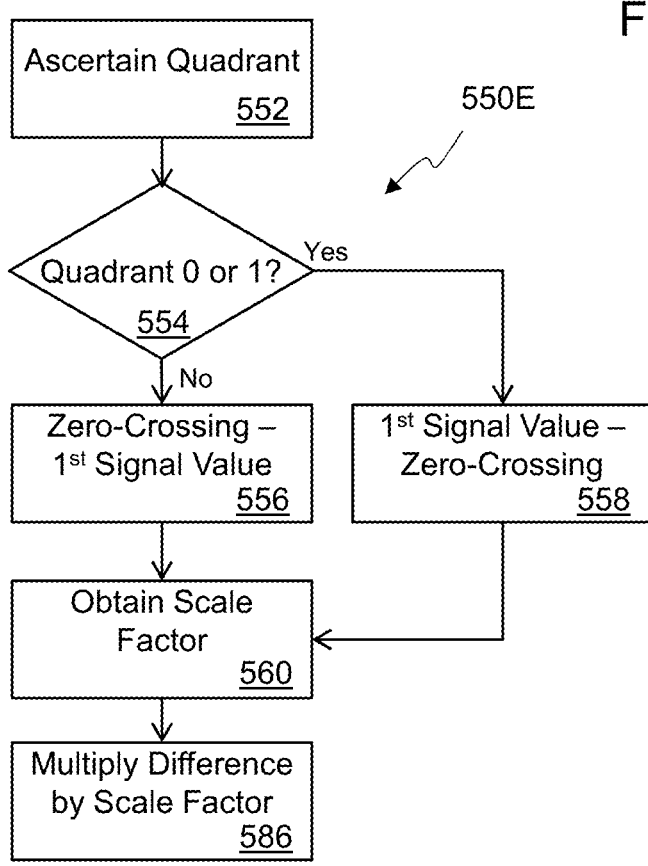
FIG. 5E

INCREMENTAL ENCODER POSITION INTERPOLATION

BACKGROUND

Technical Field

The present subject matter relates to position encoders, and more specifically, to an interface for an incremental position encoder that interpolates quadrature signals to calculate a more accurate position of the incremental encoder.

Background Art

Position encoders that provide one or more signals to indicate movement of a tracked element of the encoder are well known in the art. A position encoder may be used to track rotation of a shaft or other object and may be referred to as a rotary encoder. Other embodiments of an encoder may be used to track linear motion of a component and may be referred to as a linear encoder. An incremental encoder does not provide an absolute position of the tracked element as it moves, but provides one or more signals to indicate of movement of the element. An absolute encoder provides information about the current position of the tracked element of the encoder, such as a shaft of an absolute rotary encoder.

Many incremental encoders have two outputs that provide signals with a 90° phase relationship (i.e. a quadrature relationship) to each other as the tracked element moves. These signals may be used to determine both a direction of movement and an amount of movement of the tracked element. The frequency of the signals is proportional to a velocity of the tracked element and the phase difference between the two signals can be used to determine the direction of movement.

BRIEF DESCRIPTION OF THE DRAWINGS

The accompanying drawings, which are incorporated in and constitute part of the specification, illustrate various embodiments. Together with the general description, the drawings serve to explain various principles. In the drawings:

FIG. 1 is a block diagram of a system with a rotary incremental encoder and an embodiment of an apparatus to provide an interpolated position of the incremental encoder;

FIG. 2A shows an example of a rotary encoding disc of a rotary incremental encoder;

FIG. 2B shows detail of a section of the rotary encoding disc of FIG. 2A;

FIG. 5A-5G are flowcharts showing various aspects of an embodiment of a method to provide an interpolated position of an incremental encoder.

DETAILED DESCRIPTION

Figure 3A:
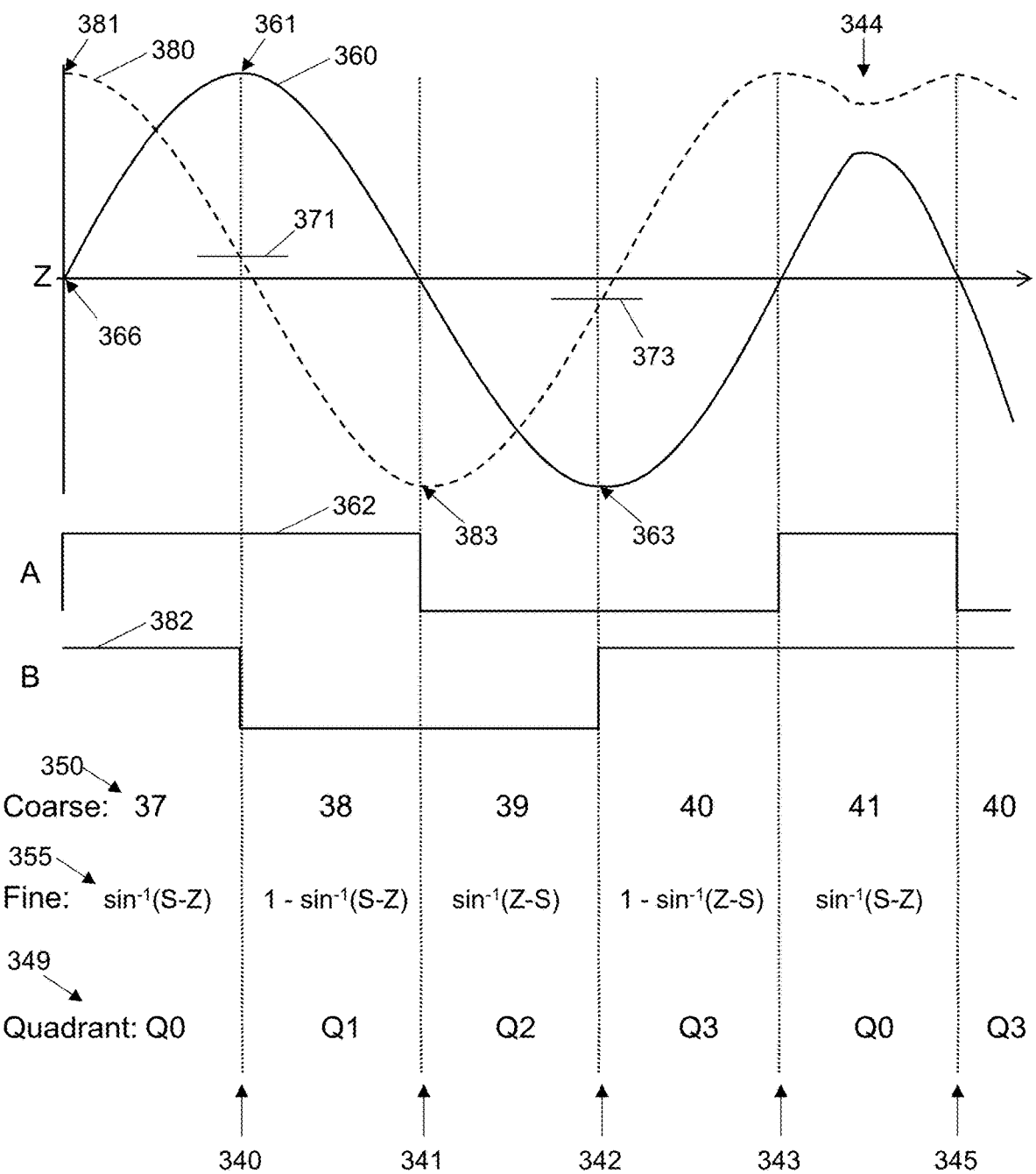
FIG. 3A shows various waveforms and generated values of an embodiment.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification.

Incremental encoders are used in many different applications. An incremental encoder can measure linear movement or rotational movement. While the concepts described herein are, in general, applicable to both linear and rotary encoders, most of the embodiments discussed herein are rotary encoders. Nonetheless, use of the concepts described herein for linear encoders is envisioned. Any type of encoder technology may be used for the incremental encoder, including mechanical contact of conductors, optical technology, magnetic technology, or capacitive technology, as non-limiting examples. That being said, an optical encoder is used for the examples herein.

An optical encoder may include a rotating disc with two concentric rings of alternating transparent and opaque areas. A second opaque element includes a slit or other opening that is positioned adjacent to the disc so that as the disc rotates, light from a light source on one side of the rotating disc can only shine through at most one transparent area of each of the two concentric rings of the disc at a time. A light sensor may be positioned on the other side of the disc/slit combination for each of the two concentric rings to detect light passing through the transparent areas of each of the rings. The outputs of the light sensors may be used to generate quadrature-encoded analog signal outputs for the encoder that may essentially be a sine wave and a cosine wave generated at a common frequency based on the speed of rotation of the disc.

An apparatus may receive the quadrature-encoded analog signals from the encoder and determine an interpolated position of the encoder (i.e. an interpolated position of the encoding disc in the encoder). The apparatus may be known by a variety of different names including an encoder interface or an encoder controller as non-limiting examples. The interpolated position may be determined by calculating a coarse position and a fine position which is added to the coarse position. The coarse position may have a resolution equivalent to between one cycle of the quadrature-encoded signals and one quarter of a cycle of the signals. The fine position provides an interpolation of the coarse position resolution. The interpolated position may be determined as a number of degrees, a number of rotations, a number of cycles of the signals, or any other unit, depending on the embodiment, and may include a whole number part and a fractional part in some embodiments. The interpolated position may be positive or negative in some embodiments to represent a movement from an index, or home, position. In at least one embodiment the interpolated position is calculated based on a unit equal to one quarter of the amount of rotation required to generate a full cycle of the quadrature-encoded signals, with the coarse position having a resolution of one unit and the fine position having a fractional value of between 0 and 1. In another embodiment the fine position may be calculated as a whole number between 0 and 999, with the coarse position increasing by 1000 for every full cycle of the quadrature-encoded signals.

In embodiments, the apparatus may generate two digital signals, A and B, based on the two quadrature-encoded analog signals, although in some embodiments, equivalent signals may be provided to the apparatus along with the quadrature-encoded analog signals (or data stream representing the quadrature-encoded signals). The A signal may be set to a '1' if the sine signal is greater than a zero-crossing value and set to a '0' value is the sine signal is less than the zero-crossing value. The B signal may be set to a '1' if the cosine signal is greater than its zero-crossing value (which may be the same or different than the zero-crossing value for the sine signal) and set to a '0' value is the cosine signal is less than the zero-crossing value. By determining whether the A signal leads B (a positive phase difference), or the B signal leads A (a negative phase difference), the direction of rotation can be determined, and the movement of the encoder determined down to one quarter of the arc per cycle. This may be accomplished through the use of a simple state machine as shown in FIG. 3B (which can be implemented as an asynchronous state machine or a synchronous state machine) and a counter to track the cumulative motion.

Figure 3B:
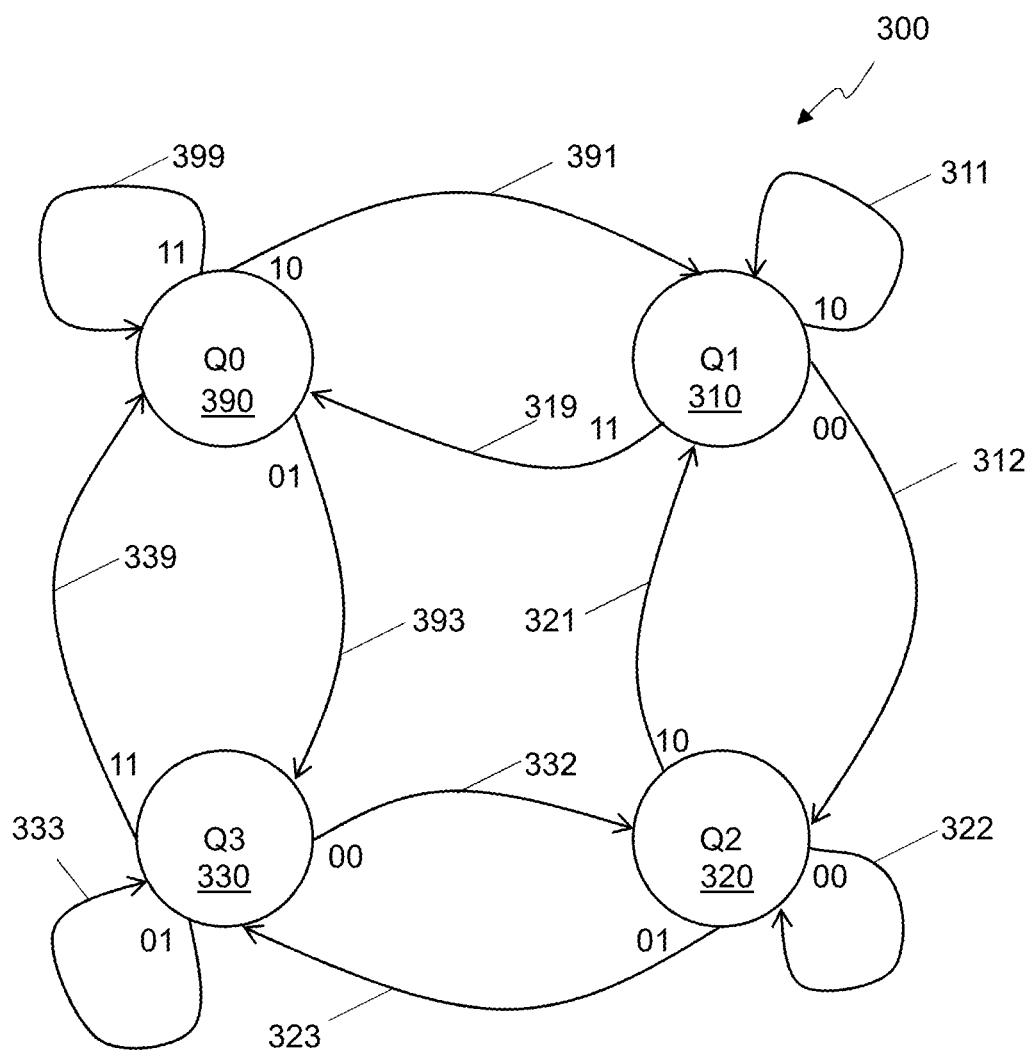
FIG. 3B shows a state diagram for an embodiment of a quadrature-tracking state machine.

So, for example, if each of the analog quadrature-encoded signals have a full cycle generated by one degree of rotation of the disc in the encoder, the A and B signals can be used to track the movement of the disc to a resolution of 15 minutes of arc (one quarter of 1° or 1 quarter of a pulse cycle) by using the quadrature-tracking state machine of FIG. 3B. Various embodiments may use a different state machine that may provide a lower resolution of tracking, such as a resolution of one half of a pulse cycle or a resolution of one pulse cycle which may allow the state machine to more reliably control the counter in a high-speed asynchronous embodiment.

The apparatus also uses the phase of the quadrature-encoded signals to calculate the fine position. In embodiments, the apparatus may digitize two analog quadrature-encoded signals and use the digital values to calculate a tangent value by dividing the value of the sine signal by the value of the cosine signal and then calculating the arctangent value to determine the fine position. While dividing the sine by the cosine to determine a tangent value may help to minimize errors due to asymmetries and noise in the analog signals, tangent values are unbounded, making it difficult to use a table lookup to calculate an arctangent value.

In other embodiments, the arcsine of the sine value or the arccosine of the cosine value may be calculated to determine the fine position. Because sine and cosine values are both bounded between 1 and −1, a table lookup can be utilized to calculate an arcsine or arccosine value. Asymmetry and/or noise in the sine/cosine signals, however, may lead to errors in the calculated fine position. Techniques are described herein for calibrating the sine/cosine signals to minimize those errors. Note that while the descriptions herein mostly discuss the calculation of the arcsine value of the sine signal, similar techniques can also be used to generate an arccosine value of the cosine signal.

A zero-crossing value for the sine signal may be calculated based on some number of previous local extrema for the sine signal and finding a midpoint between a local maximum and a local minimum of the sine signal. In some embodiments, a maximum and minimum of the sine signal over a range of motion of the encoder may be found and the zero-crossing calculated as a midpoint between the maximum and minimum of that range, with that zero-crossing value used for both the generation of the A and B digital signals described above and the calculation of the arcsine value for the full range of motion of the encoder. A similar operation may be used on the cosine signal to calculate a zero-crossing value for cosine. In at least one embodiment, the most recent local maximum and local minimum are used to calculate a current zero-crossing value that varies dynamically for each cycle of the signal as the disc of the encoder moves, but in other embodiments, a predetermined number of local maxima and local minima are used to calculate a current zero-crossing value as a moving average. Varying the zero-crossing value dependent upon the position of the encoder can help compensate for errors in the sine value due to eccentricity of the disc in the encoder, noise, or other errors in the outputs of the encoder.

Another calibration technique may find a local maximum of the sine signal and then use the value of the cosine signal at that point to set a zero-crossing value for the cosine signal falling and find a local minimum value of the sine signal and then use the value of the cosine signal at that point to set a zero-crossing value for the cosine signal rising. This may help compensate for phase errors in the cosine signal as compared to the sine signal.

The arcsine (or arccosine) may be calculated using any method, but in some embodiments, a lookup table may be used. The lookup table may store values for all four quadrants of the signal, two quadrants, or a single quadrant, depending on the embodiment. The size of the lookup table may be based on a number of bits used to represent the signal. For example, if a 12-bit analog-to-digital converter is used, a lookup table with 2048 entries could be used for an embodiment storing a single quadrant of values, with 4096 entries and 9192 entries stored, respectively, for two quadrant and four quadrant embodiments.

In some embodiments, a scaling factor is used to scale a maximum value of the signal to the maximum lookup table address to ensure that the full range of the arcsine values are utilized. The difference between the digitized sine value and the zero-crossing value is multiplied by the scaling factor and then used as the lookup address. In multiple quadrant embodiments, one or two bits describing the quadrant may also used as a part of the lookup address.

The fine position can be determined based on the quadrant as follows: Q0: $\sin^{-1}(F^*(S-Z))$; Q1: $C-\sin^{-1}(F^*(S-Z))$; Q2: $\sin^{-1}(F^*(Z-S))$; and Q3: $C-\sin^{-1}(F^*(Z-S))$; where C is the resolution of the coarse position, F is the scaling factor, Z is the zero-crossing value for the sine signal, and S is the value of the sine signal. If all four quadrants are stored in the lookup table, the full fine position can be directly stored in the lookup table with the lookup address being $F^*(S-Z)$ with one bit more than the digitized value of S to allow a twos-compliment value be generated for the Q2 and Q3 and the least significant bit of the quadrant identifier used as another address bit. If Q0 and Q1 are stored in the lookup table, then the least significant bit of the quadrant identifier may used as an address bit of the lookup table and the most significant bit of the quadrant identifier used to determine whether to calculate S−Z or Z−S. In some embodiments, the lookup table stores values for Q0 and the quadrant identifier is used to determine whether to use S−Z or Z−S in the address calculation and whether to use the lookup table output directly as the fine position or subtract the lookup table output from C to calculate the fine position. The fine position can then be added to the coarse position to provide an interpolated position for the encoder.

Any type of electronic circuitry may be used for the apparatus to provide an interpolated encoder position, including, but not limited to, a custom application-specific integrated circuit (ASIC), a circuit board with one of more active electronic components, and/or a processor running software stored in a memory. A field-programmable gate array (FPGA) is used in at least one embodiment. The FPGA may be coupled to a memory storing configuration information for the FPGA which, once loaded into the FPGA, configure various circuits of the FPGA to provide an interpolated encoder position as described herein.

Reference now is made in detail to the examples illustrated in the accompanying drawings and discussed below.

FIG. 1 is a block diagram of a system 100 with a rotary incremental encoder 140 and an embodiment of an interpolator 160 to provide an interpolated position of an incremental encoder. The rotary incremental encoder (or position encoder) 140 may be a linear encoder or a rotary encoder and the embodiment shown uses optical technology to detect motion of a carrier 110 (e.g. a disc) which is coupled 192 to a structural member 190 of the system 100 so that the carrier 110 moves based on motion of the structural member 190. The coupling 192 may use any type of interaction between the structural member 190 and the carrier 110 including, but not limited to, mounting the carrier 110 on a shaft upon which the structural member 190 rotates, gears and/or belts driven by motion of the structural member 190 to drive a shaft or an edge of the carrier 110, and physical attachment of the carrier 110 to the structural member 190. The coupling 192 may provide a fixed relationship between motion of the structural member 190 and the carrier 110 so that a position of the carrier 110 may be used to describe a position of the structural member 190.

The system 100 may also include a controller 150, coupled to the encoder 140, a computer 180 which is coupled to the controller 150 and may issue commands to the controller 150 over the command interface 182, and an actuator 170 which can move the structural member 190 and may be under control of the controller 150 through the actuator interface 172. The actuator 170 may be any type of motor, hydraulic system, pneumatic system, or other mechanism capable of moving the structural member 190.

The position encoder 140 includes a light source 102, an opaque element 105, the carrier 110, positioned adjacent to the opaque element 105, a first sensing element 136, and a second sensing element 138 which may be light-sensitive transistors in some embodiments. A first output 146 is coupled to the first sensing element 136 and a second output 148 is coupled to the second sensing element 138. The first sensing element 136 is positioned to receive light from the light source 102 that may pass through the hole 126 in the carrier 110 when it is lined up with a slit 108 in the opaque element 105 and the second sensing element 138 is positioned to receive light from the light source 102 that may pass through the hole 128 in the carrier 110 when it is lined up with a slit 108 in the opaque element 105. The encoder 140 is configured to provide a first signal at the first output 146 and a second signal at the second output 148 with the first signal having a quadrature relationship with the second signal. In some embodiments the first signal may be referred to as a sine signal and the second signal may be referred to as a cosine signal. The position encoder 140 provides incremental motion indications using the first signal and the second signal which are based on motion of the structural member 190 through its coupling 192 with the carrier 110.

The controller 150 may be coupled to the position encoder 140 by through a first input 156 and a second input 158. The controller 150 may also include the actuator interface 172 to control the actuator 170 and the command interface 182 to receive commands. The controller 150 may also include an interpolator 160 for providing an interpolated position of the position encoder 140 which may be constructed using electronic circuitry of any type, including, but not limited to a processor and memory 162 storing instructions 164 to be executed by the processor, a purpose-designed integrated circuit, a field-programmable gate array (FPGA) with memory 162 storing configuration information 164 for the FPGA, or any other type and arrangement of active and passive electronic circuitry.

Thus, embodiments may include an article of manufacture comprising a non-transitory storage medium 162 having instructions 164 stored thereon that, if executed, result in one or more methods being performed. Note that the instructions 164 may be configuration information for an FPGA in some embodiments and that executing may refer to configuring the FPGA based on the configuration information to perform one or more methods.

One method that may be performed by the interpolator 160 using the instructions 164 stored on in the memory 162 includes receiving a first signal from an incremental encoder 140 and producing a coarse position of the incremental encoder 140 based on the first signal. The first signal may be received on the first input 156. A lookup value is retrieved from a lookup table based on the first signal and a fine position of the incremental encoder is calculated using the lookup value. An interpolated position of the incremental encoder based on both the coarse position and the fine position is then provided. In some embodiments, the interpolated position may be provided through the command interface 182 to the computer 180.

In some embodiments, the method performed by the apparatus 160 using the instruction 164 stored in the memory 162 includes obtaining a digital value of the first signal and ascertaining a quadrant of the first signal at a first time. A first zero-crossing value is established for the first signal and a lookup address is computed based on the digital value and the first zero-crossing value. The lookup address is used to retrieve the lookup value from the lookup table and the fine position is calculated based on the quadrant and the lookup value.

In some embodiments, the method performed by the apparatus 160 using the instruction 164 stored in the memory 162 also includes generating a scale factor and using the scale factor in the computing of the lookup address. The scale factor may be determined iteratively based on one or more captured local extrema of the first signal and a maximum value of the lookup address.

In some embodiments, the method performed by the apparatus 160 using the instructions 164 stored in the memory 162 also includes receiving a second signal having a quadrature relationship with the first signal from the incremental encoder. The second signal may be received on the second input 158. A local maximum and a local minimum of the first signal are found and added to produce a sum, which is divided by 2 to produce a quotient. The first zero-crossing value is then established based on the quotient. The method continues by finding a first local extreme of the first signal at a second time, establishing a second zero-crossing value based on a value of the second signal at the second time, finding a second local extreme of the first signal at a third time, and establishing a fourth zero-crossing value based on a value of the second signal at the third time.

The apparatus 160 may include a quadrature-tracking state machine which is used to update the coarse position. A first indication is provided to a quadrature-tracking state machine based on the first signal crossing the first zero-crossing value in positive direction, a second indication is provided to the quadrature-tracking state machine based on the second signal crossing the second zero-crossing value in a negative direction, a third indication is provided to the quadrature-tracking state machine based on the first signal crossing the first zero-crossing value in negative direction, and a fourth indication is provided to the quadrature-tracking state machine based on the second signal crossing the fourth zero-crossing value in a positive direction. The quadrant of the first signal at the first time may be ascertained based on a state of the quadrature-tracking state machine at the first time.

FIG. 2A shows an example of a rotary encoding disc (or carrier) 110 of the rotary incremental encoder 140 of FIG. 1, and FIG. 2B shows an detail of a section 110B of the rotary encoding disc 110 of FIG. 2A. The view in FIG. 2B is a view of a portion of the carrier 110 looking from the right to the left in FIG. 1. The encoder 140 shown utilizes optical technology and the carrier 110 is constructed from an opaque material with holes through the carrier 110 used for the encoding elements 220. The encoding elements 220 include a first set of encoding elements 226 that includes a hole 126 in a first ring and a second set of encoding elements 228 that includes a hole 128 in a second ring concentric with the first ring. Both the first set of encoding elements 226 and the second set of encoding elements 228 are arranged at the same pitch distance 230 (i.e. distance apart), but the two sets of encoding elements 226, 228 are offset from each other by a distance 234 equal to one quarter of the pitch distance 230.

The encoder 140 also includes a second opaque element 105 with a slit 108 positioned next to the carrier 110 (behind the carrier 110 as shown in FIG. 2B). In other embodiments, the second opaque 105 element may have two separate openings corresponding with the first set of encoding elements 226, and the second set of encoding elements 228. The light source 102 is located behind the carrier 110 and second opaque element 105 in the view shown in FIG. 2B, so that as the carrier 110 moves past the slit 108, the carrier 110 selectively allows light to pass through the holes in the carrier or blocks the light. In the position shown in FIG. 2B, light 266 is coming through half of hole 126 of the first set of encoding elements 226 (limited by the width of slit 108), and light 268 is coming through the full hole 128 of the second set of encoding elements 228 as it is shown aligned with the slit 108.

So looking back to FIG. 1 with FIG. 2B in mind, as the carrier 110 moves past the slit 108, light from the light source 102 is selectively transmitted to the light sensors 136, 138. Depending on the embodiment, the voltage level generated by the light sensors 136, 138 used for the encoding elements 220 may be used to generate a sine signal at the first output 146 and a cosine signal at the second output 148 (which have a quadrature relationship) to send to the interpolator 160.

FIG. 3A shows various waveforms 360, 362, 380, 382 and generated values 349, 350, 355 of an embodiment. The sine signal 360 may start at a zero-crossing value Z 366 and be divided into four quadrants as shown by quadrant indicators 349. The cosine signal 380 has a quadrature relationship with the sine signal 360 in that it is equivalent to the sine signal 360 except for being shifted to the left by one quadrant (i.e. 90°).

Two digital signals, A 362 and B 382, may be generated from the sine signal 360 and cosine signal 380, respectively. Signal A 362 may be generated by comparing the value of the sine signal 360 to the zero-crossing value, Z 366, so that A 362 is high if sine 360 is greater than Z 366 and low if sine 360 is less than Z 366. The zero-crossing value Z 366 may be determined in some embodiments by finding a local maximum 361 and a local minimum 363 of the sine signal 360 and averaging them to determine Z 366. Other embodiments may determine Z 366 using other techniques.

Similarly, signal B 382 may be generated by comparing the value of cosine 380 to its own zero-crossing value, which may be determined in various ways depending on the embodiment. In at least one embodiment, the same zero-crossing value Z 366 may be used for generating the signal B 382 from the cosine signal 380, so that B 382 is high if cosine 380 is greater than Z 366 and low if cosine 380 is less than Z 366. In other embodiments, a second zero-crossing value may be determined by finding a local maximum 381 and a local minimum 383 of the cosine signal 380 and averaging them to determine the second zero-crossing value to use to generate B 382. In another embodiment, a local maximum 361 of the sine signal 360 is found, and a value 371 of the cosine signal 380 at that same time is used as the falling zero-crossing value to generate the falling edge of the signal B 382 from the cosine signal 380. Additionally, a local minimum 363 of the sine signal 360 may be found, and a value 373 of the cosine signal 380 at that same time is used as the rising zero-crossing value to generate the rising edge of the signal B 382 from the cosine signal 380. In some embodiments, hysteresis may be used in the comparisons to the zero-crossing values to ensure that noise on the sine signal 360 or cosine signal 380 does not falsely trigger a quadrant change.

FIG. 3B shows a state diagram 300 for an embodiment of a quadrature-tracking state machine. The A signal 362 and the B signal 382 may be coupled to the quadrature-tracking state machine and are shown as a two-bit value for AB next to each state transition arrow in the state diagram 300. The embodiment of the quadrature-tracking state machine shown has four states, Q0 390, Q1 310, Q2 320, and Q3 330 which correspond to the quadrants 349 shown in FIG. 3A. Table 1 below shows the behavior of the embodiment of the quadrature-tracking state machine and its control of a coarse position counter 350 which may increment or decrement based on quadrant changes.

TABLE 1

| Current State | A/B Inputs | Next State | Coarse Position |
| --- | --- | --- | --- |
| Q0 | 01 | Q3 | Decrement |
|  | 11 | Q0 | Hold |
|  | 10 | Q1 | Increment |
| Q1 | 11 | Q0 | Decrement |
|  | 10 | Q1 | Hold |
|  | 00 | Q2 | Increment |
| Q2 | 10 | Q1 | Decrement |
|  | 00 | Q2 | Hold |
|  | 01 | Q3 | Increment |
| Q3 | 00 | Q2 | Decrement |
|  | 01 | Q3 | Hold |
|  | 11 | Q0 | Increment |

In state Q0 390, if AB are 11, the next state 399 is still Q0 390, but if AB are 10, the next state 391 is Q1 310 and the coarse position counter is incremented, and if AB are 01, then next state 393 is Q3 330 and the coarse position counter is decremented. In state Q1 310, if AB are 10, the next state 311 is still Q1 310, but if AB are 00, the next state 312 is Q2 320 and the coarse position counter is incremented, and if AB are 11, then next state 319 is Q0 390 and the coarse position counter is decremented. In state Q2 320, if AB are 00, the next state 322 is still Q2 320, but if AB are 01, the next state 323 is Q3 330 and the coarse position counter is incremented, and if AB are 10, then next state 321 is Q1 310 and the coarse position counter is decremented. In state Q3 330, if AB are 01, the next state 333 is still Q3 330, but if AB are 11, the next state 339 is Q0 390 and the coarse position counter is incremented, and if AB are 00, then next state 332 is Q2 320 and the coarse position counter is decremented. Note that state transitions are only provided for three of the four possibilities for AB at each state. The missing combination of AB at each state is not expected and may be ignored or treated as an error condition, depending on the embodiment.

Referring back to FIG. 3A, example coarse position values 350 are shown for an embodiment of the quadrature-tracking state machine shown in FIG. 3B and Table 1 based on signal A 362 and signal B 382. The coarse position counter 350 changes by a single unit to indicate one quarter of the movement of the disc of the position encoder required to generate a full cycle of the sine signal 360. Note that the coarse position counter 350 increments at the transition 340 from Q0 to Q1, the transition 341 from Q1 to Q2, the transition 342 from Q2 to Q3 and the transition 343 from Q3 to Q0. But the encoder reverses direction at about time 344 and the coarse position value 350 decrements at the transition 345 from Q0 to Q3.

The fine position value 355 may be calculated using an arcsine value of a difference between the sine signal S 360 and the zero-crossing value Z 366. In some embodiments, a scaling factor may be used so that the difference between Z 366 and the local maximum 361 and local minimum 363 values is equal to 1 so that the arcsine function does not have a discontinuity at quadrant transitions. Note that the multiplication by the scaling factor is not shown in the equation for the sake of simplicity. The way that the fine position value 355 is calculated varies by quadrant with the zero-crossing value 366 being subtracted from the sine value 360 in Q0 and Q1 and the sine value 360 subtracted from the zero-crossing value 366 in Q2 and Q3 so that a positive difference is always calculated. The difference (which may be multiplied by a scaling factor) is then used as an address into a lookup table having arcsine values stored therein. In the embodiment shown, all of the arcsine values stored in the table are scaled between 0 and 1 (i.e. the radix is assumed to be to the left of the stored value) with a lookup value of 0 may access a location holding all 0s and the maximum lookup address for the table may access a location holding all 1s. Any number of bits may be stored in the lookup table, depending on the embodiment, but 16 bits of arcsine date may be stored in the lookup table in at least one embodiment.

The arcsine data from the lookup table may be directly used as the fine position in Q0 and Q2, but in Q1 and Q3, the arcsine data is subtracted from a constant that may be the increment between coarse position values (e.g. a 1 in the embodiment shown) to generate the fine position. The fine position is then added to the coarse position to generate the interpolated position of the encoder.

Figure 4:
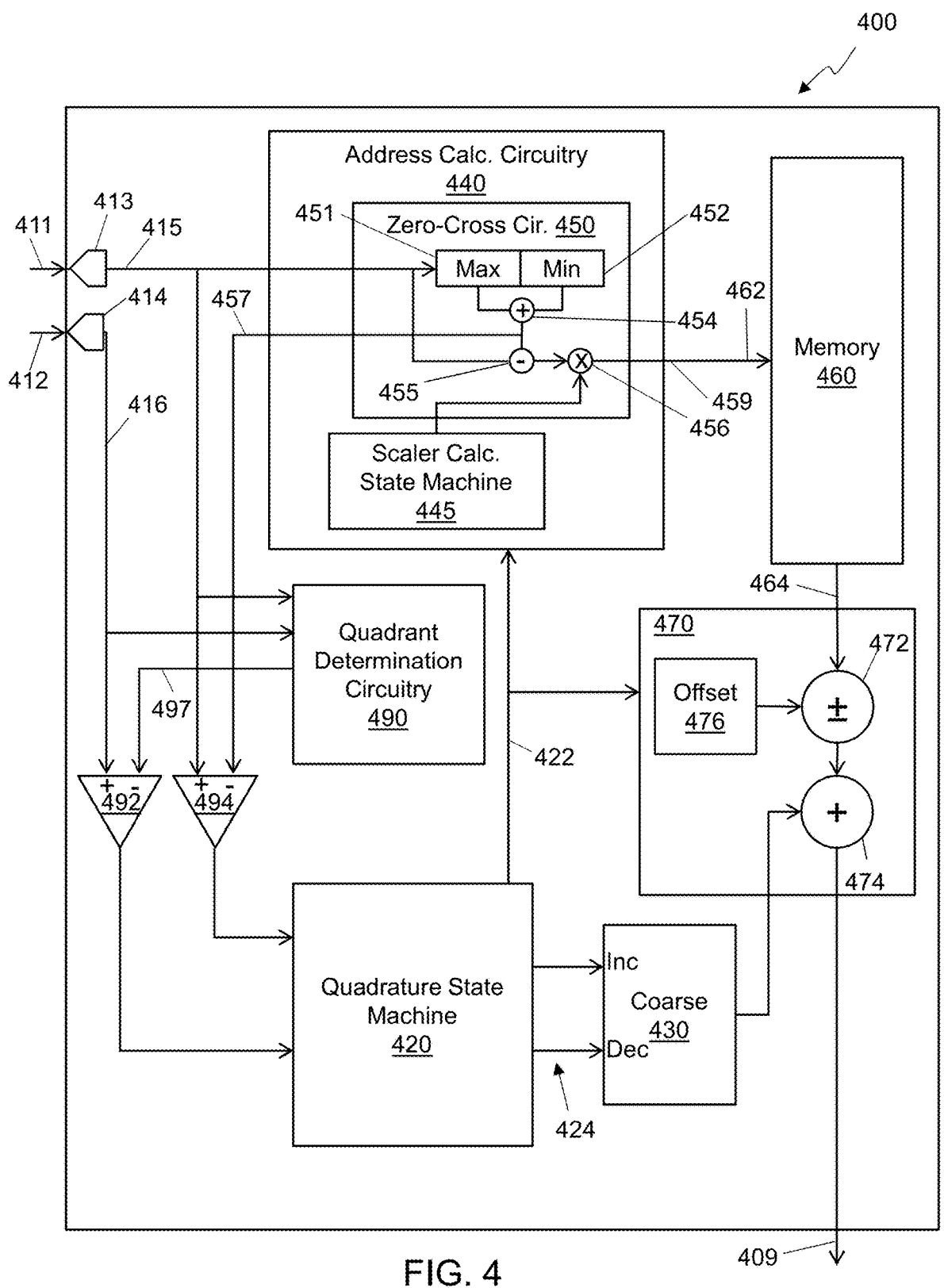
FIG. 4 is a block diagram of an embodiment of an apparatus to provide an interpolated position of an incremental encoder.

FIG. 4 is a block diagram of an embodiment of an apparatus 400 to provide an interpolated position of an incremental encoder. The apparatus includes at least one input 411, 412 configured to receive first information related to a first signal and second information related to a second signal. In the embodiment shown the at least one input includes a first analog input 411 and a second analog input 412 coupled to respective inputs of one or more analog-to-digital converters 413, 414 which may provide the first information on a first output 415 and the second information on a second output 416. In other embodiments, the at least one input may include a first digital input to receive the first information and a second digital input to receive the second information or a single digital interface configured to demultiplex the first information from the second information. Any of the digital interfaces may be a parallel interface or a serial interface and the first information and the second information both may include digital values having any number of bits of information, such as, but not limited to, 4, 8, 12, or 16 bits of information The apparatus 400 also includes a quadrature state machine 420 coupled to the at least one input 411, 412 and configured to track a quadrature relationship of the first signal and the second signal using a state machine such as that shown in FIG. 3B. The quadrature state machine 420 provides a quadrant output 422 and counter control lines 424. A coarse position counter 430 is also included in the apparatus 400. The coarse position counter 430 is coupled to the counter control lines 424 and is configured to increment and decrement under control of the quadrature state machine 420.

The apparatus may also include quadrant determination circuitry 490 coupled to the at least one input 411, 412 and configured to provide a zero-crossing value for the second information on a second zero-crossing output 497. A first comparator 494 is coupled to the first output 415 and a first zero-crossing output 457 with its output coupled to the quadrature state machine 420 and a second comparator 492 is coupled to the second output 416 and the second zero-crossing output 497 with its output coupled to the quadrature state machine 420. The quadrant determination circuitry 490 may further include circuitry to detect a first local extreme of the first information at a second time and determine the zero-crossing value for the second information based on a first value of the second information at the second time, and detect a second local extreme of the first information at a third time and determine the zero-crossing value for the second information based on a second value of the second information at the third time.

Address calculation circuitry 440 is also included in the apparatus 400. It is coupled to the at least one input 411 and the quadrant output 422 of the quadrature state machine 420 and is configured to generate a lookup address output 459. The address calculation circuitry 440 also may include zero-crossing circuitry 450 to provide a zero-crossing value for the first information on the first zero-crossing output 457. The zero-crossing circuitry 450 may also be configured to capture a local maximum 451 and a local minimum 452 of the first information provided by the first output 415 and provide a local maximum output and a local minimum output to an adder 454. The output of the adder 454 may be shifted to divide by 2 (calculating an average of the local maximum 451 and the local minimum 452) and provided to a subtraction circuit 455 which is also coupled to the first output 415.

Some embodiments may also include a scaler calculation state machine 445 configured to iteratively determine a scale factor based on one or more captured local extrema of the first information and a maximum value of the lookup address for the lookup table and provide the scale factor on an output. A multiplier 456 may be coupled to an output of the subtraction circuit 455 and the output of the scaler state machine 445. The output of the multiplier 456 is coupled to the memory 460 as the lookup address output 459.

A memory 460 having an address input 462 coupled to the lookup address output 459 is also included in the apparatus 400. The memory 460 may store a lookup table holding values based on an arcsine or an arccosine of a value of the lookup address output 459 in some embodiments. The lookup address output 459 may be interpreted as a number between 0 and 1 for the purposes of looking up the arcsine value in the lookup table 460.

The apparatus 400 also includes circuitry 470 to generate the interpolated position 409 of the incremental encoder based on both an output of the coarse position counter 430 and an output 464 of the memory 460. The circuitry 470 may also generate an offset value 476 that may be equal to an increment of the coarse counter 430 and may provide the offset value 476 to the coarse position counter as the increment/decrement value in some embodiments. A subtraction circuit 472 may be coupled to the output 464 of the memory 460 and the offset value 476 which may be controlled based on the quadrant output 422 of the quadrant state machine 420 to subtract the output 464 of the memory 460 from the offset 476 in Q1 and Q3 and simply pass the output 464 of the memory 460 to the adder 474 in Q0 and Q2. The adder 474 adds the output of the subtraction circuit 472 to the output of the coarse position counter 430 to generate the interpolated position 409 of the incremental encoder. In some embodiments, the coarse position counter 430 output is used as the whole number information to the left of the radix, and the fine position (i.e. the output of the subtraction circuit 472) is uses as the fractional information to the right of the radix, so the adder 474 simply appends the bits together instead of implementing a full adder circuit. Thus, the interpolated position 490 of the incremental encoder may be based on the output of the coarse position counter 430 and an output of the subtraction circuit 472.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions or by configuration information for a field-programmable gate array (FPGA). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. Similarly, the configuration information for the FPGA may be provided to the FPGA and configure the FPGA to produce a machine which creates means for implementing the functions/acts specified in the flowchart and/or block diagram block or blocks.

These computer program instructions or FPGA configuration information may be stored in a computer readable medium that can direct a computer, other programmable data processing apparatus, FPGA, or other devices to function in a particular manner, such that the data stored in the computer readable medium produce an article of manufacture including instructions which implement the function/act specified in the flowchart and/or block diagram block or blocks. The computer program instructions or FPGA configuration information may also be loaded onto a computer, FPGA, other programmable data processing apparatus, or other devices to cause a series of operational steps to be performed on the computer, FPGA, other programmable apparatus, or other devices to produce a computer implemented process for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code comprising one or more executable instructions, or a block of circuitry, for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figures 5A, 5B:
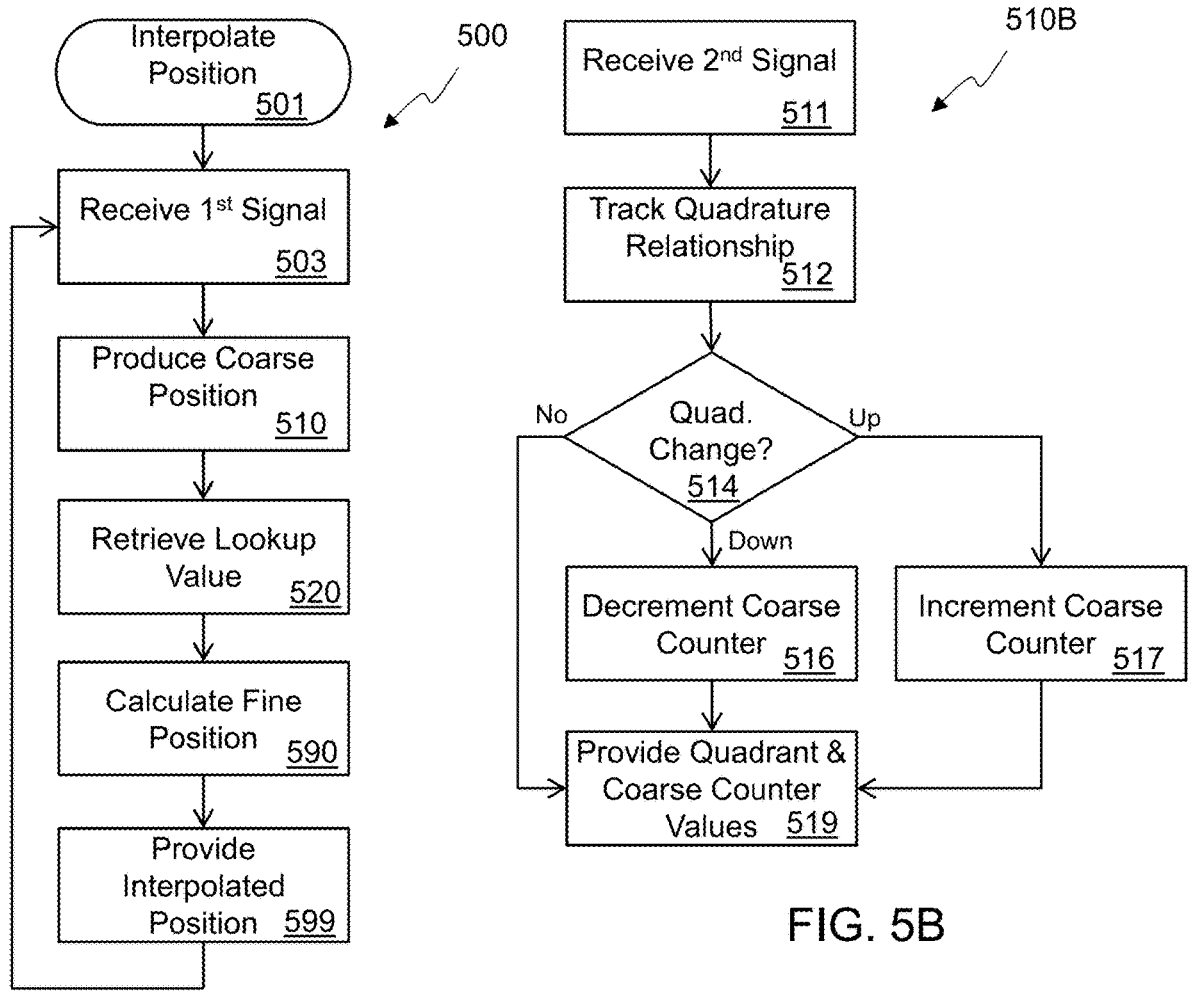

FIG. 5A is a flowchart 500 of an embodiment of a method to provide an interpolated position 501 of an incremental encoder. A first signal is received 503 from the incremental encoder and a coarse position of the incremental encoder is produced 510 based on the first signal. FIG. 5B provides more detail into how the coarse position of the incremental encoder is produced 510. In embodiments the coarse position may have a resolution that is no finer than one eighth of a cycle of the first signal, such as one cycle of the first signal, one half cycle of the first signal, or one quarter cycle of the first signal.

The flowchart 500 continues by retrieving 520 a lookup value from a lookup table based on the first signal. The lookup table may store values based on an arcsine or an arccosine of a value of the lookup address with the value of the lookup address interpreted as a number between 0 and 1. FIG. 5C-5F provide more detail into how the lookup value is retrieved 520 from the lookup table based on the first signal. A fine position of the incremental encoder is calculated 590 using the lookup value. FIG. 5G provides more detail into how the fine position of the incremental encoder is calculated 590. The flowchart 500 then provides 599 an interpolated position of the incremental encoder based on both the coarse position and the fine position and repeats.

FIG. 5B is a flowchart 510B providing more detail for producing 510 a coarse position of the flowchart 500 of FIG. 5A. A second signal is received 511 from the incremental encoder. The first signal and the second signal have a quadrature relationship which is tracked 512; in embodiments the first signal may be a sine signal and the second signal may be a cosine signal. A state machine in accordance with FIG. 3B above may be used to track 512 the quadrature relationship of the two signals. Other techniques to track 512 the quadrature relationship between the two signals may be used in other embodiments.

The tracking 512 of the quadrature relationship between the first signal and the second signal may be used to produce the coarse position of the incremental encoder. In some embodiments, one or more outputs of the quadrature-tracking state machine may be used to update the coarse position. If the quadrant changes 514 in an upward direction, that is Q0→Q1, Q1→Q2, Q2→Q3, or Q3→Q0, the coarse counter may be incremented 517. If the coarse position has a resolution of one quarter of a cycle of the first signal, it is incremented 517 at every upward quadrant change, but if a lower resolution is used, the incrementing 517 may only occur at some of the upward quadrant changes. If the quadrant changes 514 in a downward direction, that is Q0→Q3, Q1→Q0, Q2→Q1, or Q3→Q2, the coarse counter may be decremented 516. If the coarse position has a resolution of one quarter of a cycle of the first signal, it is decremented 516 at every downward quadrant change, but if a lower resolution is used, the decrementing 516 may only occur at some of the downward quadrant changes. A current quadrant indicator and the value of the coarse counter may be provided 519.

In some embodiments, the first signal and second signal may be compared to one or more zero-crossing values to determine that the quadrant of the first signal has changed 514. In at least one embodiment, a first indication of a quadrant change 514 is provided to a quadrature-tracking state machine based on the first signal crossing the first zero-crossing value in positive direction, a second indication of a quadrant change 514 is provided to the quadrature-tracking state machine based on the second signal crossing a second zero-crossing value in a negative direction, a third indication of a quadrant change 514 is provided to the quadrature-tracking state machine based on the first signal crossing a third zero-crossing value in negative direction, and a fourth indication of a quadrant change 514 is provided to the quadrature-tracking state machine based on the second signal crossing a fourth zero-crossing value in a positive direction. The quadrant of the first signal may be ascertained based on a state of the quadrature-tracking state machine.

In some embodiments, all four of the zero-crossing values may be set to the same value, but in other embodiments, two, three, or four different zero-crossing values may be used for the four different zero-crossing values. In some embodiments, the first zero-crossing value may be found as shown in flowchart 530D of FIG. 5D (described below) and the third zero-crossing value may be set to the first zero-crossing value, but in other embodiments, the third zero-crossing value may be set independently from the first zero-crossing value. In at least one embodiment the second zero-crossing value may be set by finding a first local extreme of the first signal at a second time and setting the second zero-crossing value based on a value of the second signal at the second time and the fourth zero-crossing value may be set by finding a second local extreme of the first signal at a third time and setting the fourth zero-crossing value based on a value of the second signal at the third time.

FIG. 5C is a flowchart 520C providing more detail for retrieving 520 a lookup value of the flowchart 500 of FIG. 5A. A first zero-crossing value for the first signal is established 530 and a digital value of the first signal at a first time is obtained. FIG. 5D provides more detail into how the first zero-crossing value for the first signal is established 530. A lookup address is computed 550 based on a difference between the digital value and the first zero-crossing value. FIG. 5E provides more detail into how the lookup address is computed 550. In some embodiments, a larger value and a smaller value is determined between the digital value and the first zero-crossing value and the smaller value is subtracted from the larger value to compute the lookup address. The lookup address is then used 588 to retrieve the lookup value from the lookup table and the fine position is calculated based on the quadrant and the lookup value.

FIG. 5D is a flowchart 530D providing more detail for establishing 530 a first zero-crossing value of the flowchart 520C of FIG. 5C. A local maximum of the first signal is found 532 and a local minimum of the first signal is also found 534. This establishes a value range of the first signal at least for a portion of range of movement for the incremental encoder. An average of the local maximum and local minimum is calculated 536 by adding the local maximum to the local minimum to produce a sum and shifting the sum by 1 bit position to produce a quotient. Other techniques to calculate an average may be used by other embodiments. The first zero-crossing value is then established 538 based on the quotient. Some embodiments may dynamically calculate the first zero-crossing value for each new cycle of the first signal while other embodiments, may calculate the first zero-crossing value over a range of motion of the incremental encoder and then use the value until a reset occurs or a new calibration command is received.

FIG. 5E is a flowchart 550E providing more detail for computing 550 a lookup address of the flowchart 520C of FIG. 5C. A quadrant of the first signal at the first time is ascertained 552. An indication of the current quadrant may be provided by a quadrature-tracking state machine. The ascertained quadrant is evaluated 554 to determine if the quadrant is in a first half of a cycle of the first signal (i.e. Q0 or Q1). If it is in the first half cycle, then the first zero-crossing value is subtracted 558 from the digital value of the first signal, but if it is in the second half cycle (i.e. Q2 or Q3) the digital value of the first signal is subtracted 556 from the first zero-crossing value. In some embodiments, a scale factor is then obtained 560 and the scale factor is multiplied 586 by the calculated difference between the digital value and the first zero-crossing value to compute the lookup address. The scale factor may be obtained using an iterative approach based on one or more captured local extrema of the first signal and a maximum value of the lookup address.

Figure 5F:
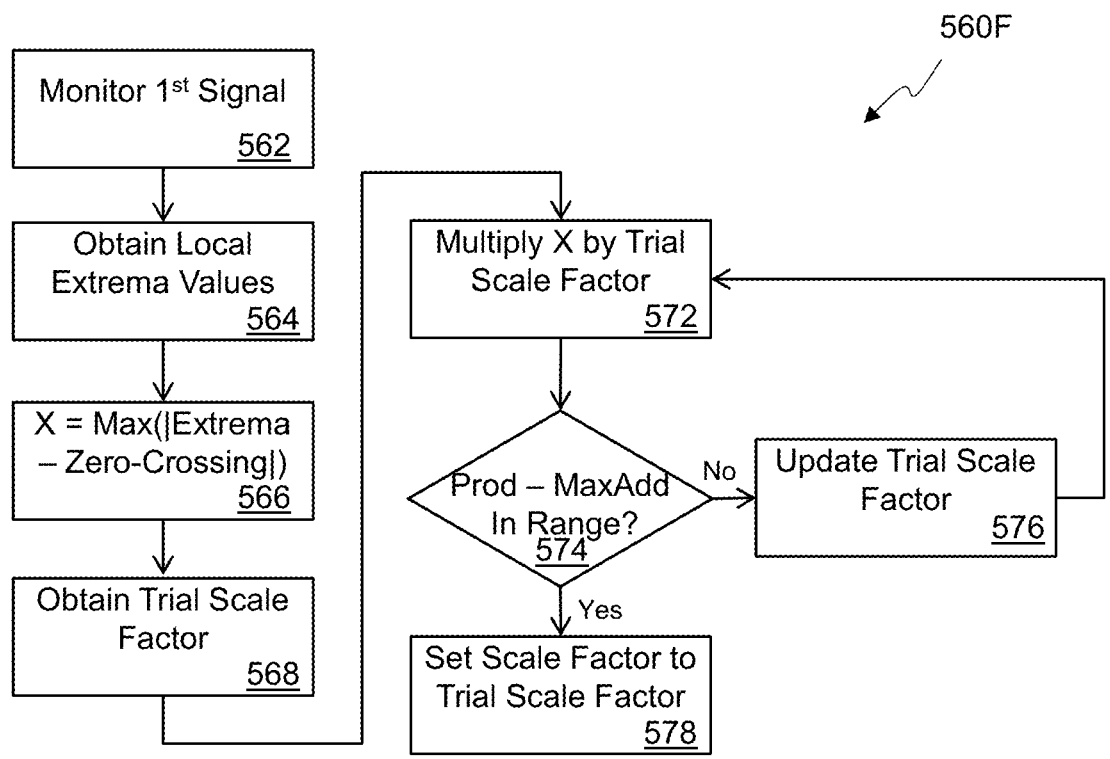
Figure 5G:
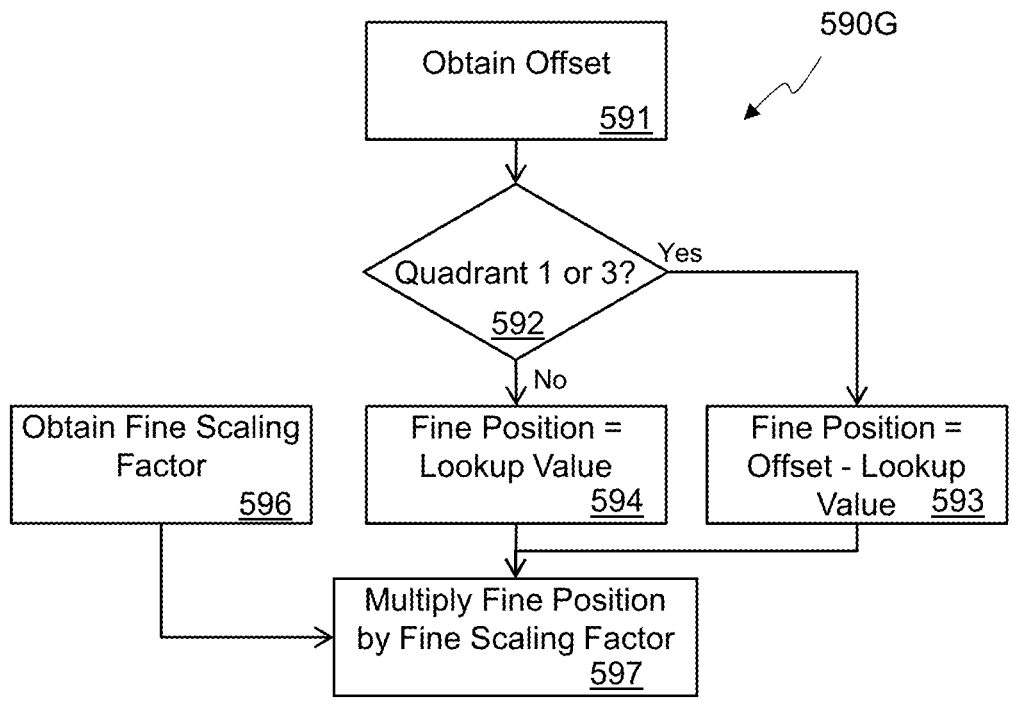

FIG. 5F is a flowchart 560F providing more detail for obtaining 560 a scale factor of the flowchart 550E of FIG. 5E. The first signal is monitored 562 over a time period preceding the first time to obtain 564 one or more local extrema values. In at least one embodiment, the one or more local extrema values consist of a single local extrema value that is captured at a second time, prior to the first time, the second time determined by a change of a quadrant of the first signal. In another embodiment the one or more local extrema values consist of between 2 and 32 local extrema values. A pre-scaled maximum value (X) is obtained finding 566 a maximum of absolute values of differences between the first zero-crossing value and the one or more local extrema values to obtain a pre-scaled maximum value. A trial scale factor is obtained 568 and the pre-scaled maximum value is multiplied 572 by the trial scale factor by to obtain a scaled maximum value.

A difference value is obtained by subtracting the scaled maximum value from the maximum value for the lookup address and evaluated to decide 574 if it is in a predetermined range. The trial scale factor is changed (i.e. updated) 576 by an amount based on the difference value in response to the difference value being outside of the predetermined range and used to multiply the pre-scaled maximum value 572 to be evaluated again. This is repeated until the difference value is within the predetermined range. The scale factor is then set 578 to the trial scale factor in response to the difference value being within the predetermined range. So the scale factor may be generated based on a maximum of absolute values of differences between the one or more local extrema values and the first zero-crossing value for the first signal.

In an embodiment the first signal may be monitored over a portion of a range of motion of the incremental encoder to obtain a maximum of an absolute value of differences between values of the first signal over the portion of the range of motion and the first zero-crossing value. The scale factor may then be generated based on a maximum value for the lookup address and the maximum of the absolute value of said differences between the values of the first signal over the portion of the range of motion and the first zero-crossing value.

In a somewhat different embodiment, the scale factor (scale) is generated based on a maximum value for the lookup address (Amax), a guard band value ($\Delta$), the one or more (n) local extrema values ($l_i$) and the first zero-crossing value (Z) for the first signal, by use of the following equation:

$$\text{scale} = \frac{A\max - \Delta}{\max(|Z - l_{ii=1 \to n}|)}.$$

In various embodiments the guard band value ($\Delta$) may have a value between 0 and 16 times a value of a least significant bit of Amax or a negative value.

FIG. 5G is a flowchart 590G providing more detail for calculating 590 a fine position of the flowchart 500 of FIG. 5A. An offset is obtained 591 which may be set to a predetermined constant value such as the resolution of the coarse position counter. In some embodiments the offset may have a value of 1. A quadrant of the first signal is ascertained and if the quadrant of the first signal at the first time is Q1 or Q3 592, the fine position is determined 593 based on subtracting the lookup value retrieved from a lookup table from the offset. The lookup table may store values based on an arcsine of a value of the lookup address, wherein the value of the lookup address is interpreted as a number between 0 and 1. If the quadrant is Q0 or Q2 592, the fine position is determined 594 based on the lookup value without using the offset.

In some embodiments, a fine scaling factor is obtained 596, which may be equal to 1 or the resolution of the coarse position counter. The fine position may be multiplied 597 by the fine scaling factor to calculate final fine position. So in at least one embodiment, the fine position may be calculated as a product of the fine scaling factor and the lookup value in response the ascertaining that the quadrant is Q0 or Q2 which are characterized by the first signal and the second signal being on a same side of the first zero-crossing value and the second zero-crossing value, respectively, and the fine position is calculated as a product of the fine scaling factor and a result of subtracting the lookup value from a constant value in response the ascertaining that the quadrant is Q1 or Q3 which are characterized by the first signal and the second signal being on opposite sides of the first zero-crossing value and the second zero-crossing value, respectively.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "apparatus," "server," "circuitry," "module," "client," "computer," "logic," "FPGA," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for an FPGA or other programmable logic as well as traditional binary computer instructions, and the term "processor" explicitly includes logic in an FPGA or other programmable logic configured by the configuration information in addition to a traditional processing core. Furthermore, "executed" instructions explicitly includes electronic circuitry of an FPGA or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object oriented programming languages such as Java, Python, C++, or the like, conventional procedural programming languages, such as the "C" programming language or similar programming languages, or low-level computer languages, such as assembly language or microcode. In addition, the computer program code may be written in VHDL or another hardware description language to generate configuration instructions for an FPGA or other programmable logic. The computer program code if converted into an executable form and loaded onto a computer, FPGA, or other programmable apparatus, produces a computer implemented method. The instructions which execute on the computer, FPGA, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Examples of various embodiments are described in the following paragraphs:

Embodiment 1. A method to provide an interpolated position of an incremental encoder, the method comprising: receiving a first signal and a second signal from the incremental encoder, the first signal and the second signal having a quadrature relationship; producing a coarse position of the incremental encoder at a first time using the quadrature relationship between the first signal and the second signal; determining an arcsine or arccosine value based on the first signal at the first time; calculating a fine position of the incremental encoder using the determined arcsine or arccosine value; and providing the interpolated position of the incremental encoder at the first time based on both the coarse position and the fine position.

Embodiment 2. A method to provide an interpolated position of an incremental encoder, the method comprising: receiving a first signal from the incremental encoder; producing a coarse position of the incremental encoder based on the first signal; retrieving a lookup value from a lookup table based on the first signal; calculating a fine position of the incremental encoder using the lookup value; and providing the interpolated position of the incremental encoder based on both the coarse position and the fine position.

Embodiment 3. The method of embodiment 2, wherein the lookup table stores values based on an arcsine or an arccosine of a value of the lookup address, wherein the value of the lookup address is interpreted as a number between 0 and 1.

Embodiment 4. The method of embodiment 2 or 3, wherein the coarse position has a resolution no finer than one eighth of a cycle of the first signal.

Embodiment 5. The method of any of embodiments 2-4, wherein the coarse position has a resolution of one cycle of the first signal, one half cycle of the first signal, or one quarter cycle of the first signal.

Embodiment 6. The method of any of embodiments 2-5, further comprising: receiving a second signal from the incremental encoder, the first signal and the second signal having a quadrature relationship; and producing the coarse position of the incremental encoder using the quadrature relationship between the first signal and the second signal.

Embodiment 7. The method of embodiment 6, wherein the first signal and the second signal are analog signals provided at two separate inputs.

Embodiment 8. The method of embodiment 6, wherein the first signal and the second signal comprise a first set of digital values and a second set of digital values.

Embodiment 9. The method of embodiment 8, wherein a value in the first set of digital values or the second set of digital values consists of 4, 8, 12, or 16 bits of information.

Embodiment 10. The method of embodiment 8 or 9, wherein the first set of digital values is received on a first serial interface and the second set of digital values is received on a second serial interface.

Embodiment 11. The method of embodiment 8 or 9, wherein the first set of digital values is received on a first parallel interface and the second set of digital values is received on a second parallel interface.

Embodiment 12. The method of embodiment 8 or 9, wherein the first set of digital values and the second set of digital values are received on a common serial interface.

Embodiment 13. The method of embodiment 8 or 9, wherein the first set of digital values and the second set of digital values are received on a common parallel interface.

Embodiment 14. The method of any of embodiments 2-13, further comprising: establishing a first zero-crossing value for the first signal; obtaining a digital value of the first signal at a first time; ascertaining a quadrant of the first signal at the first time; computing a lookup address based on a difference between the digital value and the first zero-crossing value; using the lookup address to retrieve the lookup value from the lookup table; and calculating the fine position based on the quadrant and the lookup value.

Embodiment 15. The method of embodiment 14, wherein the lookup table stores values based on an arcsine of a value of the lookup address, wherein the value of the lookup address is interpreted as a number between 0 and 1.

Embodiment 16. The method of embodiment 14 or 15, further comprising: determining a larger value and a smaller value between the digital value and the first zero-crossing value; and subtracting the smaller value from the larger value to compute the lookup address.

Embodiment 17. The method of embodiment 14 or 15, the computing the lookup address comprising: computing the lookup address by subtracting the first zero-crossing value from the digital value in response to the ascertaining that the quadrant of the first signal at the first time is in a first half of a cycle of the first signal; and computing the lookup address by subtracting the digital value from the first zero-crossing value in response to the ascertaining that the quadrant of the first signal at the first time is in a second half of the cycle of the first signal.

Embodiment 18. The method of any of embodiments 14-17, the calculating the fine position comprising subtracting the lookup value from an offset value in response to the ascertaining that the quadrant of the first signal at the first time is Q1 or Q3.

Embodiment 19. The method of embodiment 18, wherein the offset value is a predetermined constant value.

Embodiment 20. The method of any of embodiments 14-19, further comprising: receiving a second signal from the incremental encoder, the first signal and the second signal having a quadrature relationship; establishing a second zero-crossing value for the second signal; obtaining a fine scaling factor; calculating the fine position based on a product of the fine scaling factor and the lookup value in response the ascertaining that the quadrant of the first signal at the first time is characterized by the first signal and the second signal being on a same side of the first zero-crossing value and the second zero-crossing value, respectively; and calculating the fine position based on a product of the fine scaling factor and a result of subtracting the lookup value from a constant value in response the ascertaining that the quadrant of the first signal at the first time is characterized by the first signal and the second signal being on opposite sides of the first zero-crossing value and the second zero-crossing value, respectively.

Embodiment 21. The method of embodiment 20, wherein the fine scaling factor is equal to 1 and the constant value is equal to 1.

Embodiment 22. The method of any of embodiments 14-21, further comprising: finding a local maximum of the first signal; finding a local minimum of the first signal; computing an average of the local maximum and the local minimum; and establishing the first zero-crossing value based on the average.

Embodiment 23. The method of any of embodiments 14-22, the method further comprising: receiving a second signal from the incremental encoder, the first signal and the second signal having a quadrature relationship; providing a first indication to a quadrature-tracking state machine based on the first signal crossing the first zero-crossing value in positive direction; providing a second indication to the quadrature-tracking state machine based on the second signal crossing a second zero-crossing value in a negative direction; providing a third indication to the quadrature-tracking state machine based on the first signal crossing a third zero-crossing value in negative direction; providing a fourth indication to the quadrature-tracking state machine based on the second signal crossing a fourth zero-crossing value in a positive direction; updating the coarse position based on an output of the quadrature-tracking state machine; and ascertaining the quadrant of the first signal at the first time based on a state of the quadrature-tracking state machine at the first time.

Embodiment 24. The method of embodiment 23, the second zero-crossing value, the third zero-crossing value, and the fourth zero-crossing value being equal to the first zero-crossing value.

Embodiment 25. The method of embodiment 23, further comprising: finding a first local extreme of the first signal at a second time; setting the second zero-crossing value based on a value of the second signal at the second time; finding a second local extreme of the first signal at a third time; and setting the fourth zero-crossing value based on a value of the second signal at the third time.

Embodiment 26. The method of any of embodiments 14-25, further comprising:
generating a scale factor; and using the scale factor in the computing of the lookup address.

Embodiment 27. The method of embodiment 26, further comprising determining the scale factor iteratively based on one or more captured local extrema of the first signal and a maximum value of the lookup address.

Embodiment 28. The method of embodiment 26 or 27, further comprising multiplying the scale factor by the difference between the digital value and the first zero-crossing value to compute the lookup address.

Embodiment 29. The method of embodiment 26 or 28, further comprising: monitoring the first signal over a portion of a range of motion of the incremental encoder to obtain a maximum of an absolute value of differences between values of the first signal over the portion of the range of motion and the first zero-crossing value; and generating the scale factor based on a maximum value for the lookup address and the maximum of the absolute value of the differences between the values of the first signal over the portion of the range of motion and the first zero-crossing value.

Embodiment 30. The method of embodiment 26 or 28, further comprising: monitoring the first signal over a time period preceding the first time to obtain one or more local extrema values; and generating the scale factor based on a maximum value for the lookup address and the one or more local extrema values.

Embodiment 31. The method of embodiment 30, wherein the one or more local extrema values consist of a single local extrema value that is captured at a second time, prior to the first time, the second time determined by a change of the quadrant of the first signal.

Embodiment 32. The method of embodiment 30 or 31, further comprising: (a) obtaining a trial scale factor; (b) finding a maximum of absolute values of differences between the first zero-crossing value and the one or more local extrema values to obtain a pre-scaled maximum value; (c) multiplying the trial scale factor by the pre-scaled maximum value to obtain a scaled maximum value; (d) subtracting the scaled maximum value from the maximum value for the lookup address to obtain a difference value; (e) changing the trial scale factor by an amount based on the difference value in response to the difference value being outside of a predetermined range, and repeating (c), (d), and (e) until the difference value is within the predetermined range; and (f) setting the scale factor to the trial scale factor in response to the difference value being within the predetermined range.

Embodiment 33. The method of embodiment 30, wherein the one or more local extrema values consist of between 2 and 32 local extrema values, and the scale factor is generated based on a maximum of absolute values of differences between the one or more local extrema values and the first zero-crossing value for the first signal.

Embodiment 34. The method of embodiment 30, wherein the scale factor (scale) is generated based on a maximum value for the lookup address (Amax), a guard band value ($\Delta$), the one or more (n) local extrema values ($l_i$) and the first zero-crossing value (Z) for the first signal, by use of the following equation:

$$\text{scale} = \frac{A\max - \Delta}{\max(|Z - l_{ii=1 \to n}|)}.$$

Embodiment 35. The method of embodiment 34, wherein the guard band value ($\Delta$) has a value between 0 and 16 times a value of a least significant bit of Amax, inclusive.

Embodiment 36. The method of embodiment 34 or 35, wherein the guard band value (A) has a negative value.

Embodiment 37. An article of manufacture comprising a non-transitory storage medium having instructions stored thereon that, if executed, result in: receiving a first signal from an incremental encoder; producing a coarse position of the incremental encoder based on the first signal; retrieving a lookup value from a lookup table based on the first signal; calculating a fine position of the incremental encoder using the lookup value; and providing an interpolated position of the incremental encoder based on both the coarse position and the fine position.

Embodiment 38. The article of manufacture of embodiment 37, wherein the instructions, if executed, further result in: establishing a first zero-crossing value for the first signal; obtaining a digital value of the first signal at a first time; ascertaining a quadrant of the first signal at the first time; computing a lookup address based on a difference between the digital value and the first zero-crossing value; using the lookup address to retrieve the lookup value from the lookup table; and calculating the fine position based on the quadrant and the lookup value.

Embodiment 39. The article of manufacture of embodiment 38, wherein the instructions, if executed, further result in: generating a scale factor; and using the scale factor in the computing of the lookup address.

Embodiment 40. The article of manufacture of embodiment 39, wherein the instructions, if executed, further result in determining the scale factor iteratively based on one or more captured local extrema of the first signal and a maximum value of the lookup address.

Embodiment 41. The article of manufacture of any of embodiments 38-40, wherein the instructions, if executed, further result in: receiving a second signal from the incremental encoder, the first signal and the second signal having a quadrature relationship; finding a local maximum of the first signal at a second time; finding a local minimum of the first signal at a third time; computing an average of the local maximum and the local minimum; establishing the first zero-crossing value based on the average; establishing a second zero-crossing value based on a value of the second signal at the second time; establishing a third zero-crossing value based on a value of the second signal at the third time; providing a first indication to a quadrature-tracking state machine based on the first signal crossing the first zero-crossing value in positive direction; providing a second indication to the quadrature-tracking state machine based on the second signal crossing the second zero-crossing value in a negative direction; providing a third indication to the quadrature-tracking state machine based on the first signal crossing the first zero-crossing value in negative direction; providing a fourth indication to the quadrature-tracking state machine based on the second signal crossing the third zero-crossing value in a positive direction; updating the coarse position based on an output of the quadrature-tracking state machine; and ascertaining the quadrant of the first signal at the first time based on a state of the quadrature-tracking state machine at the first time.

Embodiment 42. An apparatus to provide an interpolated position of an incremental encoder, the apparatus comprising: at least one input configured to receive first information related to a first signal and second information related to a second signal; a quadrature state machine coupled to the at least one input and configured to track a quadrature relationship of the first signal and the second signal, the quadrature state machine providing a quadrant output and counter control lines; a coarse position counter coupled to the counter control lines and configured to increment and decrement under control of the quadrature state machine; address calculation circuitry, coupled to the at least one input and the quadrant output of the quadrature state machine, and configured to generate a lookup address output; a memory having an address input coupled to the lookup address output; and circuitry to generate the interpolated position of the incremental encoder based on both an output of the coarse position counter and an output of the memory.

Embodiment 43. The apparatus of embodiment 42, wherein the memory stores a lookup table comprising values based on an arcsine or an arccosine of a value of the lookup address output, wherein the lookup address output is interpreted as a number between 0 and 1.

Embodiment 44. The apparatus of embodiment 42 or 43, further comprising one or more analog-to-digital converters, wherein the at least one input comprises a first analog input and a second analog input coupled to respective inputs of the one or more analog-to-digital converters.

Embodiment 45. The apparatus of embodiment 42 or 43, wherein the at least one input comprises a first digital input to receive the first information and a second digital input to receive the second information.

Embodiment 46. The apparatus of embodiment 45, wherein the first digital input comprises a first serial interface, and the second digital input comprises a second serial interface.

Embodiment 47. The apparatus of embodiment 45, wherein the first digital input comprises a first parallel interface, and the second digital input comprises a second parallel interface.

Embodiment 48. The apparatus of embodiment 42 or 43, wherein the at least one input consists of a single digital interface configured to demultiplex the first information from the second information.

Embodiment 49. The apparatus of embodiment 48, wherein the first information and the second information both comprise digital values consisting of 4, 8, 12, or 16 bits of information.

Embodiment 50. The apparatus of embodiment 48 or 49, wherein the single digital interface consists of a serial interface.

Embodiment 51. The apparatus of embodiment 48 or 49, wherein single digital interface consists of a parallel interface.

Embodiment 52. The apparatus of any of embodiments 42-51, further comprising: circuitry to generate an offset value at an offset output; and a subtraction circuit coupled to the output of the memory and the offset output; wherein the interpolated position of the incremental encoder is based on both the output of the coarse position counter and an output of the subtraction circuit.

Embodiment 53. The apparatus of any of embodiments 42-51, further comprising: circuitry coupled to the at least one input and configured to provide the first information on a first output; circuitry coupled to the first output and configured to provide a zero-crossing value for the first information on a zero-crossing output; and a subtraction circuit coupled to the first output and the zero-crossing output, an output of the subtraction circuit coupled to the lookup address output.

Embodiment 54. The apparatus of any of embodiments 42-53, further comprising: circuitry coupled to the at least one input and configured to provide the first information on a first output; circuitry coupled to the first output and configured to capture a local maximum and a local minimum of the first information and provide a local maximum output and a local minimum output; an adder coupled to the local maximum output and the local minimum output; a subtraction circuit coupled to the first output and an output of the adder; and a multiplier coupled to an output of the subtraction circuit and a scaler output, an output of the multiplier coupled to the memory as the lookup address output.

Embodiment 55. The apparatus of embodiment 54, further comprising a scaler calculation state machine configured to: iteratively determine a scale factor based on one or more captured local extrema of the first information and a maximum value of the lookup address for the lookup table; and provide the scale factor on the scaler output.

Embodiment 56. The apparatus of any of embodiments 42-55, further comprising: circuitry coupled to the at least one input and configured to provide the first information on a first output, the second information on a second output, a zero-crossing value for the first information on a first zero-crossing output, and a zero-crossing value for the second information on a second zero-crossing output; a first comparator coupled to the first output and the first zero-crossing output, an output of the first comparator coupled to the quadrature state machine; and a second comparator coupled to the second output and the second zero-crossing output, an output of the second comparator coupled to the quadrature state machine.

Embodiment 57. The apparatus of embodiment 56, further comprising circuitry to: detect a first local extreme of the first information at a second time and determine the zero-crossing value for the second information based on a first value of the second information at the second time; and detect a second local extreme of the first information at a third time and determine the zero-crossing value for the second information based on a second value of the second information at the third time.

Embodiment 58. At least one non-transitory machine readable medium comprising one or more instructions that in response to being executed on a computing device cause the computing device to carry out a method according to any one of embodiments 1 to 36.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g. 1 to 5 includes 1, 2.78, $\pi$, $3.\overline{33}$, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A method to provide an interpolated position of an incremental encoder, the method comprising:
    receiving a first signal from the incremental encoder;
    producing a coarse position of the incremental encoder based on the first signal;
    finding a local maximum of the first signal;
    finding a local minimum of the first signal;
    computing an average of the local maximum and the local minimum;
    establishing a first zero-crossing value for the first signal based on the average;
    obtaining a digital value of the first signal at a first time;
    ascertaining a quadrant of the first signal at the first time;
    computing a lookup address based on a difference between the digital value and the first zero-crossing value;
    using the lookup address to retrieve a lookup value from the lookup table; and
    calculating a fine position based on the quadrant and the lookup value;
    providing the interpolated position of the incremental encoder based on both the coarse position and the fine position.

2. The method of claim 1, wherein the lookup table stores values based on an arcsine or an arccosine of a value of the lookup address, wherein the value of the lookup address is interpreted as a number between 0 and 1.

3. The method of claim 1, further comprising:
    receiving a second signal from the incremental encoder, the first signal and the second signal having a quadrature relationship; and
    producing the coarse position of the incremental encoder using the quadrature relationship between the first signal and the second signal.

4. The method of claim 1, the computing the lookup address comprising:
    computing the lookup address by subtracting the first zero-crossing value from the digital value in response to the ascertaining that the quadrant of the first signal at the first time is in a first half of a cycle of the first signal; and
    computing the lookup address by subtracting the digital value from the first zero-crossing value in response to the ascertaining that the quadrant of the first signal at the first time is in a second half of the cycle of the first signal.

5. The method of claim 1, the calculating the fine position comprising subtracting the lookup value from an offset value in response to the ascertaining that the quadrant of the first signal at the first time is Q1 or Q3.

6. The method of claim 1, the method further comprising:
    receiving a second signal from the incremental encoder, the first signal and the second signal having a quadrature relationship;
    providing a first indication to a quadrature-tracking state machine based on the first signal crossing the first zero-crossing value in positive direction;
    providing a second indication to the quadrature-tracking state machine based on the second signal crossing a second zero-crossing value in a negative direction;
    providing a third indication to the quadrature-tracking state machine based on the first signal crossing a third zero-crossing value in negative direction;
    providing a fourth indication to the quadrature-tracking state machine based on the second signal crossing a fourth zero-crossing value in a positive direction;
    updating the coarse position based on an output of the quadrature-tracking state machine; and
    ascertaining the quadrant of the first signal at the first time based on a state of the quadrature-tracking state machine at the first time.

7. The method of claim 6, further comprising:
    finding a first local extreme of the first signal at a second time;
    setting the second zero-crossing value based on a value of the second signal at the second time;
    finding a second local extreme of the first signal at a third time; and
    setting the fourth zero-crossing value based on a value of the second signal at the third time.

8. The method of claim 1, further comprising:
    generating a scale factor; and
    using the scale factor in the computing of the lookup address.

9. The method of claim 8, further comprising determining the scale factor iteratively based on one or more captured local extrema of the first signal and a maximum value of the lookup address.

10. The method of claim 8, further comprising multiplying the scale factor by the difference between the digital value and the first zero-crossing value to compute the lookup address.

11. An article of manufacture comprising a non-transitory storage medium having instructions stored thereon that, if executed, further result in:
receiving a first signal from an incremental encoder;
producing a coarse position of the incremental encoder based on the first signal;
finding a local maximum of the first signal;
finding a local minimum of the first signal;
computing an average of the local maximum and the local minimum;
establishing a first zero-crossing value for the first signal based on the average;
obtaining a digital value of the first signal at a first time;
ascertaining a quadrant of the first signal at the first time;
computing a lookup address based on a difference between the digital value and the first zero-crossing value;
using the lookup address to retrieve the lookup value from the lookup table; and
calculating a fine position based on the quadrant and the lookup value;
providing an interpolated position of the incremental encoder based on both the coarse position and the fine position.

12. The article of manufacture of claim 11, wherein the instructions, if executed, further result in:
generating a scale factor; and
using the scale factor in the computing of the lookup address.

13. The article of manufacture of claim 11, wherein the lookup table stores values based on an arcsine or an arccosine of a value of the lookup address, wherein the value of the lookup address is interpreted as a number between 0 and 1.

14. The article of manufacture of claim 11, wherein the instructions, if executed, further result in:
computing the lookup address by subtracting the first zero-crossing value from the digital value in response to the ascertaining that the quadrant of the first signal at the first time is in a first half of a cycle of the first signal; and
computing the lookup address by subtracting the digital value from the first zero-crossing value in response to the ascertaining that the quadrant of the first signal at the first time is in a second half of the cycle of the first signal.

15. An apparatus to provide an interpolated position of an incremental encoder, the apparatus comprising:
at least one input configured to receive first information related to a first signal and second information related to a second signal;
a quadrature state machine coupled to the at least one input and configured to track a quadrature relationship of the first signal and the second signal, the quadrature state machine providing counter control lines;
a coarse position counter coupled to the counter control lines and configured to increment and decrement under control of the quadrature state machine;
address calculation circuitry, coupled to the at least one input and configured to capture a local maximum and a local minimum of the first information, calculate a first zero-crossing value for the first signal by adding the local maximum and local minimum, determine a difference between the first zero-crossing value and a current value of the first information received from the at least one input, and generate a lookup address output using the difference;
a memory having an address input coupled to the lookup address output; and
circuitry to generate the interpolated position of the incremental encoder based on both an output of the coarse position counter and an output of the memory.

16. The apparatus of claim 15, further comprising:
circuitry to generate an offset value at an offset output; and
a subtraction circuit coupled to the output of the memory and the offset output;
wherein the interpolated position of the incremental encoder is based on both the output of the coarse position counter and an output of the subtraction circuit.

17. The apparatus of claim 15, further comprising a scaler calculation state machine configured to:
iteratively determine a scale factor based on one or more captured local extrema of the first information and a maximum value of the lookup address for the lookup table; and
multiply the difference by the scale factor to generate the lookup address.

18. The apparatus of claim 15, wherein the lookup table stores values based on an arcsine or an arccosine of a value of the lookup address, wherein the value of the lookup address is interpreted as a number between 0 and 1.

19. The apparatus of claim 15, the address calculation circuitry coupled to a quadrant output of the quadrature state machine and further configured to:
determine the difference by subtracting the first zero-crossing value from the current value of the first information in response to the quadrant output indicating that that the quadrant of the first signal is in a first half of a cycle of the first signal; and
determine the difference by subtracting the current value of the first information from the first zero-crossing value in response to the quadrant output indicating that that the quadrant of the first signal is in a second half of the cycle of the first signal.

* * * * *